Sept. 20, 1966 R. H. PRAGER 3,274,557

DISPLAY SIMULATOR FOR COMPUTER-AIDED SYSTEMS

Filed July 24, 1962 2 Sheets-Sheet 1

INVENTOR.
ROGER H. PRAGER

BY

[signature]

ATTORNEYS

DISPLAY SIMULATOR FOR COMPUTER-AIDED SYSTEMS

Filed July 24, 1962 2 Sheets-Sheet 2

INVENTOR.
ROGER H. PRAGER
BY
ATTORNEYS 3,274,557
Patented Sept. 20, 1966

3,274,557

DISPLAY SIMULATOR FOR COMPUTER-AIDED SYSTEMS

Roger H. Prager, San Diego, Calif., assignor to the United States of America as represented by the Secretary of the Navy Filed July 24, 1962, Ser. No. 212,172
5 Claims. (Cl. 340—172.5)

The invention described herein may be manufactured and used by or for the Government of the United States of America for governmental purposes without the payment of any royalties thereon or therefor.

The present invention relates in general to computer display systems and in particular is a system for symbolically displaying digital information relevant to target detection in computer-aided search systems.

In the past, computer-generated data have been displayed by means of connecting the computer to a display console through a direct communication channel. However, for many applications, this has been found to leave a great deal to be desired, since so doing results in considerable waste of valuable computer time in out-putting to the display, particularly if complex programs involving rapid repetitive sequences are employed and, of course, sequences of this type are essential if operators are to perform optimally in situations requiring such complex tasks as recognition of patterns. In addition, modification by the operator of the sequence in use requires further communication with the computer, and only a limited capacity for such modification could be incorporated in an operational computer program.

The present invention substantially overcomes these difficulties in that it optimizes computer time considerably by requiring only a minimum of computer time for ocmmunication with the display console, it facilitates for most practical purposes the modification of the display sequence by the operator without requiring access to the computer, and it enables flexibility in display sequence to be retained as a result of operation from magnetic tape inputs during both research display simulations and actual field activities.

It is, therefore, an object of this invention to provide an improved readout display system for computer-aided systems.

Another object of this invention is to provide a new and improved symbolic display of digital information relevant to target detection in computer-aided sonar and radar search systems.

Another object of this invention is to provide a general purpose display system having self-contained logic and control for effecting efficient display utilization in both simulation and actual operational activities.

A further object of this invention is to provide a method and means of saving valuable computer time by minimizing the required computer display console communication time, especially when complex programs and rapid repetitive sequences are involved.

A further object of this invention is to provide a method and means for improving operator recognition of the patterns of digital computer readout displays.

Another object of this invention is to provide an improved computer display system which allows an operator to modify the display sequence directly, without requiring access to the computer.

Another object of this invention is to provide a computer display means which may be operated from magnetic tape inputs for off-line simulation purposes while retaining flexibility in display sequence.

Still another object of this invention is to provide an improved electronic symbolic display simulator which may be efficiently combined with a Charactron cathode ray tube to effect readout in terms of numbers, alphabetical letters, and other pre-determined symbols as desired.

A further object of this invention is to provide an improved electronic symbolic display simulator that may be programmed by either a direct connection to a digital computer or by means of computer-produced magnetic tapes.

A further object of this invention is to provide an improved electronic symbolic display simulator that may be effectively combined with sonar, radar, or data-handling systems to produce intelligible readout therefor.

Other objects and many of the attendant advantages of this invention will be readily appreciated as the same becomes better understood by reference to the following detailed description when considered in conjunction with the accompanying drawings in which like reference numerals designate like parts throughout the figures thereof and wherein.

Figure 1:
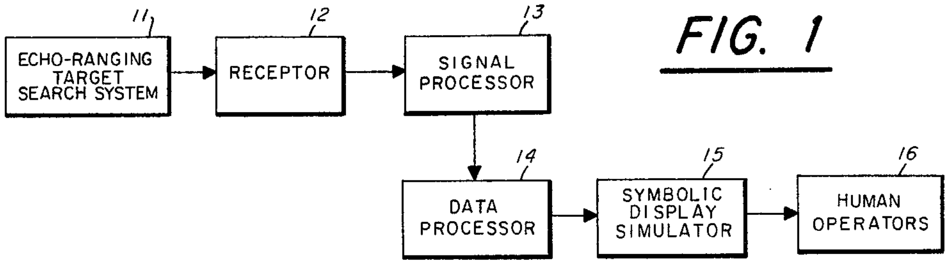
FIG. 1 is a block diagram representing a large class of computer-aided target search systems showing the symbolic display simulator of this invention incorporated therein as part of the decision-making apparatus thereof.

Referring now to FIG. 1, there is shown an echo-ranging system 11 which may be of any preferred type which supplied input signals that are to be effectively displayed in the subject symbolic display simulator subsequently. Such echo-ranging systems may be of the target search type such as sonar systems, radar systems, optical tracking systems, or the like. In this particular case, said output signals from echo-ranging system 11 are applied to a receptor 12, which may be a receiver-type system that encompasses data-organizing devices such as beam forming networks, scanning switches, demodulators, filters and clippers which conventionally prepare the signals applied thereto for further processing in a signal processor 13. This signal processor may be any system that attempts to separate desired input information from the ever-present background interference such as, for example, random noise, clutter, reverberations, and jamming signals. For this purpose, it is also well known in the art to accomplish signal enhancement by means of matched-filtering, autocorrelation, cross-correlation, etc. The output of signal processor 13 is applied to a data processor 14 which may, for instance, select events by means of a set of appropriate criteria and then program the events onto displays for human observation thereof. Such data processors may actually include well known computer systems which will be further discussed in connection with FIGS. 2 and 3. The output of data processor 14 is supplied to a symbolic display simulator 15 of the type disclosed in detail herein for presenting pertinent readout that may, for example, be observed and acted upon accordingly by human operators 16.

As can readily be seen, data processor 14, symbolic display simulator 15, and human operators 16 make up the decision-making portion of this representative general class of computer-aided search system. Actually, the computer of data processor 14 and human operators 16 make the decisions and take the necessary action based thereon. These decisions may vary widely in nature, as well as in level of complexity, from system to system.

Since FIG. 1 is intended to only represent a general class of such computer-aided target search systems, typical procedures and decisions may be, for instance, single-ping or single-scan detection on the basis of amplitude and Doppler information, multiple-ping detection on the basis of space-time configuration criteria, target classification on the basis of tests applied to detected events, and tracking and fire control operations. Obviously, if so desired, the aforementioned human operators may be completely eliminated and the subject system be made completely automatic with the computer of data processing system making all of the relevant decisions.

As previously mentioned, many of the presently existing advanced sonar and radar systems are of the general type described above which may be combined with the symbolic display simulator of this invention to advantage. Furthermore, large tactical data systems such as SAGE and NTDS are essentially of this same species, since they utilize central computers to process data for several search systems. In addition, a number of modern communication systems also fall into this same category.

Figure 2:
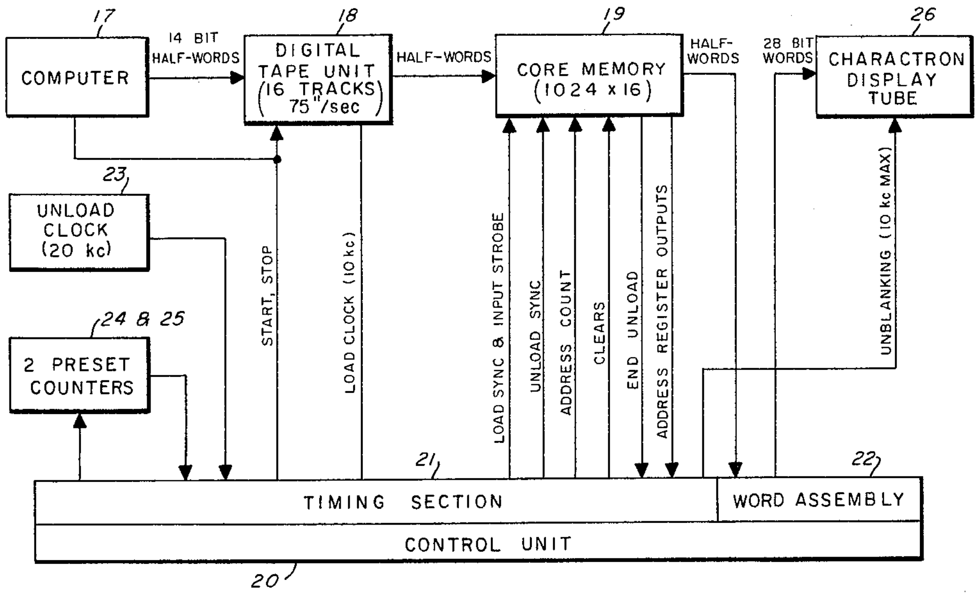
FIG. 2 is a block diagram representing a simplified and summarized version of this invention.

Referring now to FIG. 2, the simplified block diagram thereof shows the subject symbolic display simulator as being combined with a data processing computer 17 which may, for example, be of the AN/USQ–17 NTDS unit computer type. The intelligence output thereof consists of 14-bit half-words which are applied as the input signals to a 16-track, 75-inch per second digital tape recorder unit 18 which, for instance, may be the model 906 digital tape unit that is manufactured by the Potter Instrument Company of Long Island, New York. In addition, control signals such as a ready signal, a resume signal, and stop (S), forward (F), and reverse (R) signals are effectively supplied to digital tape recorder unit 18 by digital computer 17. The output of digital tape unit 18 is also 14-bit half-words that are supplied as the input signals to a core memory 19, which may be of the type manufactured by the Computer Products Division of the Ampex Corporation of Los Angeles, California, as their model 1024–RB–16.

A control unit 20 contains a timing and control section 21 and a word assembly section 22 which are respectively connected to digital tape unit 18 and core memory 19 in the following manner: a load clock 10 kilocycle pulse is supplied from digital tape unit 18 to the timing and control section 21 of control unit 20 when the half-words are being read from the tape; start and stop pulses are supplied by timing and control section 21 of control unit 20 to digital tape unit 18; load sync and input strobe pulses, unload synch pulses address register count pulses, and several clear pulses are supplied by timing and control unit 21 to core memory 19; and address register output signals, end unload pulses and half-word output signals are supplied by core memory 19 to timing and control section 21 and word assembly section 22, respectively. An unload clock 23 supplies a 20-kilocycle per second signal to timing and control section 21. A pair of preset counters 24 and 25 likewise supplies their outputs to timing and control section 21 of control unit 20 and receives an input therefrom as well, as will be more fully described subsequently. A display console 26 containing a Charactron shaped beam tube, designated as model S–C1000, manufactured by General Dynamics/Electronics division of General Dynamics Corporation, San Diego, California, receives a set of inputs from the aforesaid control unit 20 in the form of an unblanking 10-kilocycle per second maximum pulse from timing and control section 21 and a 28-bit word signal from word assembly 22.

It should be understood that all of the aforementioned computers, digital tape units, core memory storage unit, and Charactron display console are conventional, well known in the art, and may be purchased commercially from their respective manufacturers; however, it should also be understood that if so desired, any suitable comparable devices may be substituted therefor in order to take advantage of any particular operational procedures.

In the device of FIG. 2, the digital tape unit contains special logic for communication with the computer and is used to record the computer-generated information for playback at some future time. This arrangement permits operation of the subject simulator completely independently of the computer if preferred. Complete display blocks are recorded separately on the tape, with sufficient spacing between blocks to allow the tape unit to stop and start. The core memory provides a recirculating store so that a single block from the tape may be repeated on the display console. The number of repetitions and the time interval between repetitions are dialed on the two preset counters, so that a high degree of flexibility in display programming is obtained. Of course, the control unit times the entire playback operation.

Figure 3:
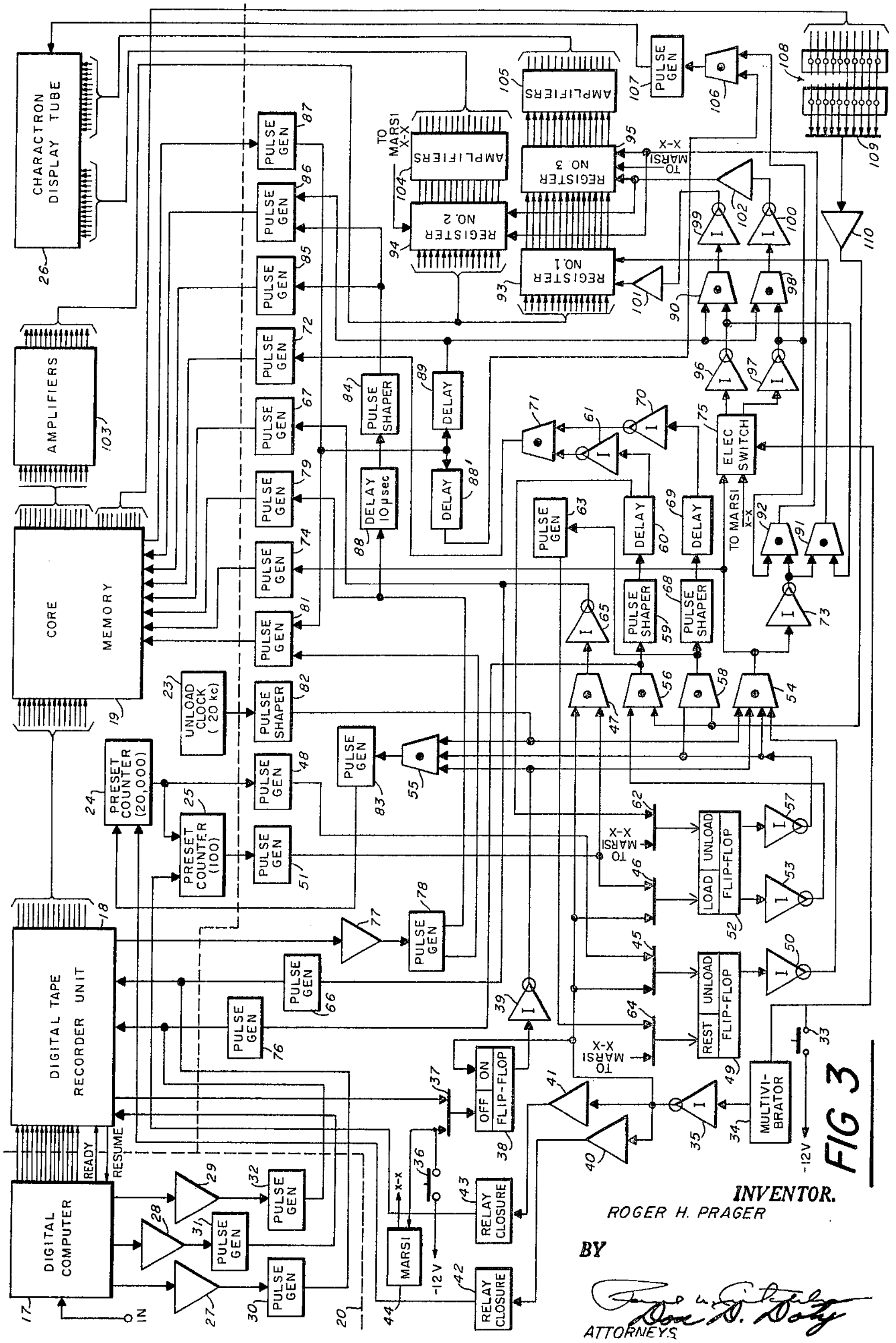
FIG. 3 is a detailed block diagram of the subject symbolic display simulator illustrating the complete logic of the control unit incorporated therein.

For a detailed disclosure of the device of FIG. 2, reference is hereby made to FIG. 3 which likewise depicts computer 17, digital tape unit 18, core memory 19, unload clock 23, preset counters 24 and 25 and Charactron display console 26 combined with a detailed disclosure of the structural elements making up control unit 20.

As a general rule, most digital computers incorporate a plurality of amplifiers 27, 28, and 29 and their respective pulse generators 30, 31, and 32 for generating and supplying forward, reverse, and stop pulse signals to the digital tape unit associated therewith, if any, and in this particular case, to digital tape unit 18. Digital computer 17 also is herein disclosed as supplying a ready signal to digital tape unit 18 as well as receiving a resume signal therefrom for the purpose of controlling transfer of information.

Control unit 20 is connected to a power supply (not shown) for receiving the necessary voltages and power to operate it. One of such voltages is a 12 volt supply which is connected through a start pushbutton switch 33 to the input of a multivibrator 34, the output of which is coupled to the input of an inverter 35. Also connected to said 12 volt supply is a stop pushbutton switch 36 which, in turn, is connected to one of the inputs of an OR gate 37. The other input of said OR gate 37 is supplied as an end of tape sensing pulse from digital tape unit 18, and the output therefrom is coupled to the input of the off section of a flip-flop 38. The output of inverter 35 is also coupled to the input of the on section of said flip-flop 38, the output of which is connected to the input of an inverter 39. The output of inverter 35 is also coupled through a pair of amplifiers 40 and 41 to relays 42 and 43 which, in turn, have their outputs respectively connected to one of the inputs of preset counters 25 and 24. The output of pushbutton stop switch 36 which is connected as one of the inputs of OR gate 37 is likewise connected to a master reset switch (MRSI) 44. The output of inverter 35 is also coupled as one of the inputs to a pair of OR gates 45 and 46 as well as to one of the inputs of a NOR gate 47. OR gate 45 receives its other input from a pulse generator 48 which in turn, receives its input from preset counter 24.

The output of OR gate 45 is connected to the input of the unload section of a flip-flop 49, the output of which is coupled to the input of an inverter 50. The other input to OR gate 46 is connected to the other input of NOR gate 47 and the output of a pulse generator 51 which, in turn, receives its input from the output of preset counter 25. Preset counters 24 and 25 are effectively cascaded by means of having the outputs of counter 24 coupled as the input to counter 25. The output of OR gate 46 is coupled to the input of the load section of a flip-flop 52, the output of which is coupled to an inverter 53. The output of inverter 39 is coupled to one of the inputs of a NOR gate 54 and also to one of the inputs of a NOR gate 55. The output of inverter 50 is likewise coupled as one of the inputs to said NOR gate 54, and the output of inverter 53 is coupled to the input of another NOR gate 56. The output of the unload section of flip-flop 52 is coupled to the input of an inverter 57, the output of which is applied as one of the inputs to each of the aforesaid NOR gates 54 and 55 and to one of the inputs of another NOR gate 58. The output of NOR gate 56 is coupled through a pulse shaper 59 to a five microsecond delay 60, the outputs of which are supplied to an inverter 61 and to one input of an OR gate 62, the other input of which is coupled to the aforesaid master reset switch 44. The output of OR gate 62 is coupled to the input of the unload section of flip-flop 52. The output of NOR gate 58 is coupled to the input of a pulse generator 63, the output of which is coupled to an OR gate 64 as one of the inputs thereto with the other input thereto received from the aforesaid master reset switch 44. The output of OR gate 64 is supplied to the reset section of flip-flop 49. The output of NOR gate 47 is supplied through an inverter 65 to a pulse generator 66 which in turn connects to the same input of digital tape unit 18 that the output of pulse generator 30 is connected to. The output of inverter 65 is also connected to a pulse generator 67, the output of which supplies a system clear pulse to one of the inputs of core memory 19. The output of NOR gate 58 is also supplied to a pulse shaper 68, a five microsecond delay 69 and inverter 70, to one of the inputs of a NOR gate 71, the other input of which is received from the aforesaid inverter 61. The output of NOR gate 71 is applied to a pulse generator 72, the output of which is an address register clear signal which is supplied to one of the inputs of the core memory 19. The output of NOR gate 54 is simultaneously supplied to the input of an inverter 73, a pulse generator 74, and an electronic switch 75. The other inputs to electronic switch 75 are received from the aforesaid master reset switch 44 and from the aforesaid start pushbutton switch 33, the latter of which supplies a minus twelve volt set signal. The output of NOR gate 56 also is connected to the input of a pulse generator 76, the output of which is connected to the same input of digital tape unit 18 as the output of pulse generator 32 is connected.

One of the outputs of digital tape unit 18 consists of a load clock pulse which is amplified by an amplifier 77 before being applied to the input of a pulse generator 78 having a pair of outputs, one of which is coupled to the respective inputs of a pulse generator 79 and a ten microsecond delay 88, and the other of which is supplied to the input of another pulse generator 81. The output of unload clock 23 is applied through a pulse shaper 82 to the remaining inputs of NOR gates 54 and 55. The output of NOR gate 55 is supplied through a pulse generator 83 to preset counter 24. The output of delay 88 is shaped by pulse shaper 84 and then applied through pulse generator 85 and one of the inputs of pulse generator 86, the outputs of which are applied to core memory 19 as memory register clear signals and address register count signals respectively. An end unload signal is received by a pulse generator 87 from the aforesaid core memory 19 and supplies it as the other input to pulse generator 81, the output of which is supplied back to core memory 19 as a load synchronization signal. The output of pulse generator 74, pulse generator 79 and pulse generator 86 are likewise connected to input of core memory 19 for respectively supplying unload synchronization signals, memory strobe signals, and address register count signals thereto. The output of pulse generator delay 87 is also applied to the input of a ten microsecond delay 88' and a five microsecond delay 89, with the output of said delay 89 applied to the other input of the aforesaid pulse generator 86 and to one of the inputs of a NOR gate 90.

The output of the aforesaid inverter 73 is simultaneously coupled to one of the inputs of a pair of NOR gates 91 and 92 with the output of NOR gate 91 being applied as the clear signal to one of the inputs of a #1 register 93 and with the output of NOR gate 92 being applied as the clear signal to one of the inputs of #2 and #3 registers 94 and 95.

The output of the aforesaid electronic switch 75 consists actually of a pair of outputs and are applied to a pair of inverters 96 and 97, with the output of inverter 96 being applied to the other input of NOR gate 90 and the other input of NOR gate 91 while the output of inverter 97 is applied to one of the inputs of a NOR gate 98 and also to the other input of said NOR gate 92. Said one input of NOR gate 90 is coupled to the other input of NOR gate 98. The output of NOR gates 90 and 98 are respectively inverted in inverters 99 and 100, after which they are amplified in amplifiers 101 and 102 before being applied as the transfer signals to shift registers 93, 94 and 95, respectively. For reset purposes, said registers 93, 94, and 95 also have their other input connected from the output of master reset switch 44. The inputs to shift registers 1, 2 and 3 actually consists of a plurality of inputs, and the inputs to registers 93 and 94 are obtained from the aforesaid core memory 19 through an appropriate bank of amplifiers 103. As can be seen, the plurality of outputs of register 93 are applied as the inputs to register 95, and the plurality of outputs of both register 94 and 95 are respectively amplified by amplifiers 104 and 105 before being applied as 28 data line inputs to the aforesaid Charactron display console 26.

The output of the aforesaid ten microsecond delay 88' and inverter 97 are applied as the inputs to a NOR gate 106, the output of which is applied through a pulse generator 107 to become the unblanking input signal to Charactron display console 26.

Core memory 19 also has another plurality of outputs which represent the address register output signals and these signals are applied to a patchboard 108 having a like plurality of connectors which may be cross-coupled as desired in order to effect the storage of the desired number of words thereon. The plurality of address register output signals from patch 108 are applied to the inputs of an OR gate 109 with the output thereof being amplified to an amplifier 110 before being applied to the other inputs of NOR gates 56 and 58.

As will be recognized, all of the block diagram elements shown below the horizontal dashed line of FIG. 3 actually constitute the aforementioned control unit 20. The amplifiers and pulse generators of the upper left hand corner referenced by numerals 27 through 32 are usually mounted in and are a part of tape unit 18; however, in event that a digital tape unit is selected which does not contain these components, they should be incorporated in the subject invention as an addition to the digital tape unit.

Figure 4:
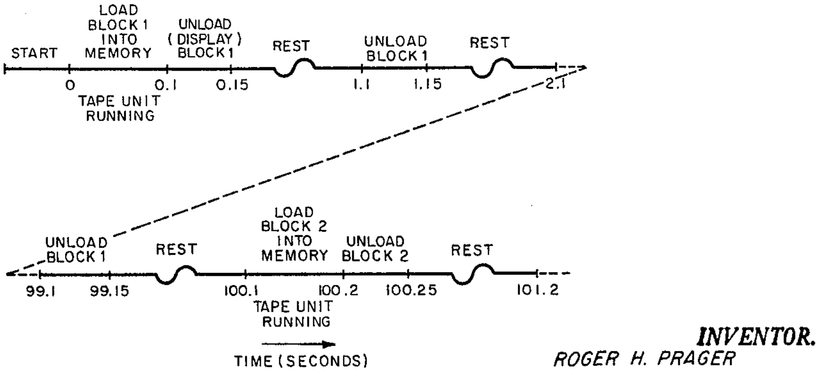
FIG. 4 is a graphical representation of a typical timing cycle used for programming the display unit of this invention.

Preset counter settings, shown in FIG. 3, correspond to the typical timing cycle illustrated in FIG. 4. This timing cycle is, of course, selected to provide optimum operational display procedures for a particular type of system. But it should be understood that any preferred sequence and preset counter settings may be employed as warranted to provide the operational display desired.

Within the control unit itself, —10 volts has been selected as a logical "1" and 0 volts as a logical "0". The computer, tape unit, and core memory use —12.5 volts for a logical "0" and zero volts for a logical "1" on the 14 data lines. The Charactron console uses —17.5 volts as a logical "0" and zero volts as a logical "1" on 27 of its input data lines with the 28th one thereof acting as a spare.

Although the aforementioned Charactron display console, the core memory unit, and the digital tape unit have been herein disclosed as being well known and conventional and available commercially from their respective manufacturers, it should be understood that any suitable corresponding devices may be substituted therefor in event they perform to same or substantially similar specifications. For example, the display console presently used contains a C21Q Charactron shaped beam tube having a P14 medium-long-persistence phosphor "face" with an orange filter placed thereover to eliminate the blue flash of said phosphor. The console requires one 27-bit binary word to display a symbol. Six bits are employed to deflect the electron beam through one of sixty-four possible symbols in the matrix or stencil in the electron gun of the tube. The shaped beam is recentered and twenty bits are used (ten bits are for the X deflection and ten bits for the Y deflection) to deflect the beam to the desired location on the tube face. The remaining bit selects one of two symbol sizes that may be preset by adjustment to size between .08 and 0.4 inches.

Computer words are broken into half-words and are handled in that form by the tape unit and core memory unit. The control unit reassemble the words as they are unloaded from the memory for display. Words may be presented to the console at a maximal rate of ten kilocycles per second and each word must be held for a full one hundred microseconds. The latter requirement explains the need for a twenty kilo-cycle per second unload clock and the three-register word assembly procedures used in the control unit shown in FIG. 3. The only control signal required by the console is the unblanking pulse which initiates the display of each symbol.

The core memory mentioned above is a highly flexible unit having a capacity of 1024 sixteen-bit words and the capability of operating in either the random access or sequential buffer mode. Actually, in the subject simulator, only the sequential buffer mode is employed. A load or unload operation requires 5 microseconds and a complete load-unload cycle requires ten microseconds. The complete cycle is utilized during unload and is obtained by feeding the end unload pulse from the core memory back into the core memory as a load synchronization pulse prior to the next unload synchronization pulse.

The subject tape unit contains sixteen tracks on a one inch tape. It records and plays back in forward or reverse speeds of 37.5 or 75 inches per second. Maximum packing density is two-hundred bits per inch per track. When the push button controls are in the automatic position the tape unit is under remote control and may be given forward, reverse, or stop commands from external equipment such as, for instance, the computer during recording and the control unit during playback. Recording is performed at a ten kilocycle per second rate, that is, a 10,000 half-words per second rate, and the tape is run at 75 inches per second during both record and playback. Along with each 14-bit half-word, the unit records "sprocket" pulses on the two remaining tracks. Special logic is provided as follows: during recording, the tape unit accepts the computers ready signal to initiate recording of a word and transmits a resume signal to indicate that the word has been recorded; during playback, the two sprocket pulses are gated and the resulting pulse is used to generate the load clock for the control unit.

In event substitution is made for the aforementioned computer, digital tape unit, core memory, and Charactron display console, the corresponding components substituted therefor need only perform the aforementioned operational procedures when they are so connected therefor.

It, of course, should also be understood that all of the aforementioned block representations are conventional and well known in the art per se, and it is their unique interconnection, combination, and interaction that constitutes the subject invention.

The overall operation of the invention will now be discussed briefly in connection with the detailed disclosure thereof illustrated in FIG. 3.

As a prequisite for actual running, several conditions must be fulfilled. First, the start push button switch 33 must be momentarily closed. This sets the on-off flip-flop to on, the load-unload flip-flop to the load state, the unload-rest flip-flop to the unload state, and the electronic switch to the 2 state. Also, the preset counters are cleared, and the tape recorder is started. The setting of the electronic switch enables NOR gates 92, 98 and 106.

In actual practice the foregoing is effected by manually closing start button switch 33 which causes multivibrator 34 to produce a pulse that is inverted by inverter 35, amplified in amplifiers 40 and 41, after which it actuates relays 42 and 43 to preset counters 24 and 25 to zero. At the same time, said pulse performs a number of other necessary functions, viz: sets flip-flops 38, 49, and 52 to on, unload, and load states, respectively; passes through NOR gate 47 where it is inverted by inverter 65, then shaped by pulse generator 67 before being applied as a system clear (SC) signal to clear core memory 19. Also after inversion by inverter 65, it is shaped by pulse generator 66 and applied to digital tape recorder 18 for starting same in the forward direction. This, of course, causes half-words to start emanating from the tape recorder.

After the aforementioned preliminary operations are accomplished, the load sequence is ready to commence. As a result of running the tape of recorder 18, a load clock (LC) signal comes therefrom which is amplified by amplifier 77, appropriately shaped by pulse generators 78, 79, and 81 to respectively supply a memory register strobe (MRS) signal and a load sync (LS) signal to core memory 19, which, in turn, causes a half-word to be taken from tape recorder 18 and put into core memory 19. Said shaped load clock pulse from pulse generator 78 is also delayed ten microseconds in delay 88, reshaped in pulse shaper 84 and pulse generators 85 and 86 before being supplied as memory register clear (MAS) and address register count (A.C.) signals to core memory 19. Due to the aforesaid delay, these memory clear and address register count signals occur ten mircoseconds after the aforesaid load sync and memory register strobe signals; therefore, they clear the memory register of core memory 19 after the half-word has been stored so that the memory is then ready to take in the next half-word, and at the same time causes the address register to count up one count.

This process keeps recurring; that is, half-word after half-word keeps coming off the tape until the address register of core memory has counted up to the desired number of counts that has been programmed into patch 108 as a result of the manual jumping of the proper terminals thereof. At this time, a pulse passes through OR gate 109, is amplified by amplifier 110 and goes through NOR gate 56 and pulse generator 76 to stop the running of the tape in tape recorder 18 by means of a stop (S) signal. The output from NOR gate 56 also is shaped by pulse shaper 59, delayed five microseconds in delay 60, inverted in inverter 61, passes through NOR gate 71, and reshaped by pulse generator 72 before being applied as an address register clear signal to core memory 19. After said five microsecond delay by delay 60, said signal also passes through OR gate 62 to set flip-flop 52 to the unload state. This completes the load sequence and now the unload sequence commences.

During the load operation, NOR gates 54 and 55 were both disabled or closed, but as soon as flip-flop 52 has been set in the unload status, an unload signal emanates therefrom, is inverted by inverter 57, and is applied as one of the inputs to NOR gates 54 and 55, enabling same. Because unload clock 23 is free-running, unload clock (UC) pulses at the rate of twenty kilocycles per second are continuously produced thereby, and as soon as NOR gates 54 and 55 are enabled, said unload clock pulses pass through them. After the first unload clock pulse passes through NOR gate 54, it is shaped by pulse generator 74 and applied as the unload sync signal to core memory 19. It also switches electronic switch 75 to the 1 state, which, in turn, enables NOR gates 90 and 91 after being inverted by inverter 96 and disables NOR gate 92, 98 and 106 at the same time. When NOR gate 91 is enabled, said clock pulse passes therethorugh from inverter 73 and NOR gate 54 and clears register 93. Five microseconds later, an end unload (EU) signal is produced by core memory 19. It is shaped by pulse generators 87 and 81 and fed back to core memory 19 as a load sync signal. Accordingly, said unload sync (US) signals bring a half-word out of core memory storage and, of course, the load sync signal then writes the same half-word back into it. After five microseconds delay by delay 89, the end unload signal is shaped by pulse generator 86 from which it is applied to the address register of core memory 19 and causes it to count up one count. Furthermore, it passes through NOR gate 90, inverter 99, and amplifier 101 to provide a transfer signal to register 93, thereby transferring the half-word from the memory register of the core memory into register 93.

The second unload pulse from NOR gate 54 switches the electronic switch 75 back to the 2 state, enabling NOR gates 92, 98 and 106. It is applied through inverter 73 to NOR gate 92 to clear registers 94 and 95 and through pulse generator 74 to core memory 19 as the unload sync signal thereto. Again, after five microseconds, an end unload pulse emanates from core memory 19 and is fed back thereto as a load sync signal after processing by pulse generators 87 and 81. It is also delayed further by delay 89 for five microseconds, and applied to NOR gate 98 which, in turn, produces a signal that is inverted by inverter 100, amplified by amplifier 102 and supplied as a transfer signal to registers 94 and 95, transferring the half-word from the memory register of core memory 19 into register 94 and transferring the contents of register 93 into register 95. The contents of registers 94 and 95 are amplified by amplifiers 104 and 105 before being applied and combined as a pair of fourteen-bit half-words to Charactron display 26. Of course, when said fourteen-bit half-words are so combined, they actually make a twenty-eight bit word for the Charactron. Thus, it can be seen that the first pair of unload pulses from core memory 19 effect a 28-bit word for display in Charactron 26, and the second, third, and so on, pairs do likewise until the original number of half-words manually set up on patch 108 (which is the number of half-words put into core memory 19 by tape recorder 18) occurs in the address register.

The aforesaid end unload signal from pulse generator 87 is also delayed further by ten microseconds in delay 88' and applied to NOR gate 106. A pulse therefrom is shaped by pulse generator 107 and timely applied to Charactron display 26 as an unblanking signal therefor.

According to the aforesaid patch setting, an appropriate signal passes through OR circuit 109, is amplified by amplifier 110, and applied to one of the inputs of each of NOR gates 56 and 58. Said NOR gates 56 and 58 being complementary, one is closed while the other is open and vice versa, and, hence, the output from amplifier 110 can only pass through NOR gate 56 during the loading cycle and through NOR gate 58 during the unloading cycle. The output of NOR gate 58 is shaped by pulse generator 63 and fed through OR gate 64 to set flip-flop 49 in the rest status thereby unenabling NOR gate 54. At the same time, the output of NOR gate 58 is shaped by pulse shaper 68, delayed five microseconds by delay 69, inverted by inverter 70, fed through NOR gate 71, reshaped by pulse generator 72, and applied to core memory 19 as an address register clear signal therefor.

When the unload cycle is effected as a result of flip-flop 52 being shifted from the load state to unload state, an enabling unload signal is applied to NOR gate 55 along with the On signal, and then when one of the pulses of the twenty kilocycle per second unload clock signal arrives thereat, an appropriately shaped pulse is applied to preset counter 24 which, in turn, counts up one. This preset counter is used to determine the time between unload cycles. In this case (i.e., the typical cycle illustrated in FIG. 4), this interval happens to be one second; hence, preset counter is set at 20,000. Every second preset counter 25 receives a signal from the output of preset counter 24 and this counter, of course, counts the unload cycles and determines when a new load cycle should take place (in the typical cycle of FIG. 4, after 100 seconds). According to the preferred embodiment herein disclosed, the subject invention is so designed to repetitively unload the core memory every second and start over and reload it every one hundred seconds. As can be seen in FIG. 4, the graphical representation of a typical timing cycle used for display programming, one hundred repetitions of a word block are displayed by Charactron 26 at one second intervals. The ten kilocycle per second maximum rate for the disclosed Charactron imposes a maximum rate of about twenty blocks per second for full blocks of five hundred and twelve symbols, but this repetition rate is sufficient to provide a display which is flicker-free at appropriate intensity. The one-per-second repetition rate is slow enough, however, so that the pulsing of the Charactron is not particularly annoying to the human operator.

Obviously, many modifications and variations of the present invention are possible in the light of the above teachings. It is, therefore, to be understood that within the scope of the appended claims the invention may be practiced otherwise than as specifically described.

What is claimed is:

1. A display simulator for computer-aided systems comprising in combination, tape recorder means adapted for receiving and recording fourteen bit half-words and concomitant regulatory signals and timely producing successive sets of fourteen bit half-words as the output therefrom, memory means coupled to the output of said tape recorder means for storing each of said successive sets of fourteen bit half-words a predetermined time period, means connected to the output of said memory means for assembling successive adjacent pairs of said fourteen bit half-words into twenty-eight bit words, means connected to said assembling means for displaying said twenty-eight bit words, and means interconnecting each of the aforesaid means for timing the respective aforementioned functions thereof to effect the display of said twenty-eight bit words by said display means so that they will be read out as predetermined coherent symbolic characters.

2. The device of claim 1 wherein said means connected to the output of said memory means for assembling successive adjacent pairs of said fourteen bit half-words into twenty-eight bit words include a plurality of registers, amplifier means respectively coupled thereto, and means for timely shifting said registers to effect supplying said twenty-eight bit words to said displaying means for said readout thereby.

3. The device of claim 1 wherein said means connected to said assembling means for displaying said twenty-eight bit words comprises a Charactron display tube.

4. A display simulator for computer-aided systems comprising in combination, a computer, a digital tape recorder connected for receiving and recording the output data signals from said computer, a memory coupled to the output of said recorder, an electronic beam-forming tube for displaying the aforesaid data signals in terms of predetermined characters, means connected to said recorder and said memory for loading said memory with a plurality of bits representing said data signals, means coupled to said loading means for unloading said memory as successive groups of bits each of which contain a plurality of bits equal in number to the number of bits loaded in said memory during each loading, means coupled to said loading and unloading means and said memory for combining adjacent pairs of said successive groups of bits, and means connected to said loading and unloading means and the aforesaid electronic beam-forming tube for timely supplying said combined groups of bits thereto for readout thereby in terms of predetermined intelligence signals.

5. A display simulator for computer-aided systems comprising in combination: a computer for processing predetermined input data; a digital tape recorder operationally coupled to the outputs of said computer; a core memory coupled to the output of said digital tape recorder; conrtol unit means having a timing section and a word assembly means incorporated therein, with the timing section thereof connected to said digital tape recorder and said core memory for timing the respective recording and memory operations performed thereby, and with the word assembly means thereof connected to the output of said core memory; a Charactron cathode ray display tube coupled to the output of the word assembly means of said control unit means; means connected to the timing section of said control unit means and effectively connected to said core memory for timely initiating the loading and unloading thereof; and counter means connected to the timing section of said control unit means and effectively connected to said core memory for indicating the amount of data displayed by the aforesaid Charactron cathode ray display tube.

References Cited by the Examiner

UNITED STATES PATENTS

| | | | |
|---|---|---|---|
| 2,920,312 | 1/1960 | Gordon | 343—5 |
| 3,037,192 | 5/1962 | Everett | 340—172.5 |

ROBERT C. BAILEY, *Primary Examiner.*

G. D. SHAW, *Assistant Examiner.*